United States Patent
Zhang et al.

(10) Patent No.: US 11,476,684 B2
(45) Date of Patent: Oct. 18, 2022

(54) CHARGING PROTECTION METHOD, TERMINAL, AND CHARGER

(71) Applicant: HUAWEI TECHNOLOGIES CO., LTD., Guangdong (CN)

(72) Inventors: Fenwei Zhang, Beijing (CN); Haitao Tian, Xi'an (CN)

(73) Assignee: Huawei Technologies Co., Ltd., Guangdong (CN)

( * ) Notice: Subject to any disclaimer, the term of this patent is extended or adjusted under 35 U.S.C. 154(b) by 328 days.

(21) Appl. No.: 16/328,951

(22) PCT Filed: Aug. 29, 2016

(86) PCT No.: PCT/CN2016/097206
§ 371 (c)(1),
(2) Date: Feb. 27, 2019

(87) PCT Pub. No.: WO2018/039881
PCT Pub. Date: Mar. 8, 2018

(65) Prior Publication Data
US 2019/0245362 A1    Aug. 8, 2019

(51) Int. Cl.
*H02J 7/00*    (2006.01)
*H02H 3/30*    (2006.01)
*H02H 1/00*    (2006.01)

(52) U.S. Cl.
CPC .......... *H02J 7/0029* (2013.01); *H02H 3/305* (2013.01); *H02J 7/00* (2013.01); *H02J 7/0091* (2013.01); *H02H 1/0061* (2013.01)

(58) Field of Classification Search
CPC .............. H02J 7/0029; H02J 7/00714

USPC .................................................. 320/137, 150
See application file for complete search history.

(56) References Cited

U.S. PATENT DOCUMENTS

| | | | |
|---|---|---|---|
| 3,835,362 A * | 9/1974 | Greene | G01R 31/382 320/134 |
| 9,493,079 B2 * | 11/2016 | Stichowski | H02J 7/007 |
| 2009/0174976 A1 | 7/2009 | Saga et al. | |
| 2010/0013442 A1 | 1/2010 | Yamazaki et al. | |
| 2010/0156355 A1 * | 6/2010 | Bauerle | B60L 53/11 320/145 |

(Continued)

FOREIGN PATENT DOCUMENTS

| | | |
|---|---|---|
| CN | 101390265 A | 3/2009 |
| CN | 103078300 A | 5/2013 |

(Continued)

OTHER PUBLICATIONS

Machine Translation of CN 105703423 (Year: 2016).*

(Continued)

*Primary Examiner* — Samuel Berhanu
(74) *Attorney, Agent, or Firm* — Fish & Richardson P.C.

(57) ABSTRACT

A terminal obtains a parameter from a charger, including at least one of an input voltage value and an output current value of the charger and a temperature value of a charging output port of the charger. When a parameter value is greater than a threshold, the terminal terminates a charging process based on a relationship between a corresponding threshold and at least one of a difference between the output current value of the charger and an input current value of the terminal, a power loss from the charger to the terminal, and a temperature value.

9 Claims, 9 Drawing Sheets

(56) References Cited

U.S. PATENT DOCUMENTS

| | | | |
|---|---|---|---|
| 2014/0225567 A1* | 8/2014 | Stichowski | B60L 53/00 320/109 |
| 2015/0084589 A1* | 3/2015 | Tsai | H02J 50/10 320/108 |
| 2015/0123602 A1* | 5/2015 | Patino | H02J 50/60 320/108 |
| 2015/0198640 A1* | 7/2015 | Lee | H02J 50/60 320/108 |
| 2016/0049803 A1* | 2/2016 | Hsu | H02J 7/00 320/162 |
| 2016/0059716 A1* | 3/2016 | Gale | B60L 53/66 320/109 |
| 2017/0271897 A1 | 9/2017 | Wen | |
| 2018/0026471 A1 | 1/2018 | Lu et al. | |
| 2018/0337600 A1* | 11/2018 | Neumayr | H02M 3/1563 |
| 2019/0036361 A1 | 1/2019 | Zhang | |
| 2019/0041437 A1* | 2/2019 | Abeywickrama | G01R 21/1331 |

FOREIGN PATENT DOCUMENTS

| | | |
|---|---|---|
| CN | 103178573 A | 6/2013 |
| CN | 103545889 A | 1/2014 |
| CN | 103683388 A | 3/2014 |
| CN | 103701182 A | 4/2014 |
| CN | 203747451 U | 7/2014 |
| CN | 104377660 A | 2/2015 |
| CN | 104467123 A * | 3/2015 |
| CN | 104767260 A | 7/2015 |
| CN | 105141005 A | 12/2015 |
| CN | 105703423 A | 6/2016 |
| JP | 2006320084 A | 11/2006 |
| JP | 2008131788 A | 6/2008 |
| WO | 2015113463 A1 | 8/2015 |
| WO | 2016106616 A1 | 7/2016 |

OTHER PUBLICATIONS

Office Action issued in Chinese Application No. 201680088445.7 dated Jul. 23, 2019, 10 pages.

PCT International Search Report and Written Opinion issued in International Application No. PCT/CN2016/097206 dated Jun. 1, 2017, 20 pages (with English translation).

Extended European Search Report issued in European Application No. 16914451.6 dated Jul. 19, 2019, 7 pages.

* cited by examiner

CHARGING PROTECTION METHOD, TERMINAL, AND CHARGER

CROSS REFERENCE TO RELATED APPLICATION

This application is a National Stage of International Application No. PCT/CN2016/097206, filed on Aug. 29, 2016, which is incorporated herein by reference in its entirety.

TECHNICAL FIELD

This application relates to the communications field, and in particular, to a charging protection method, a terminal, and a charger.

BACKGROUND

As electronic devices are more widely applied, fast charging the electronic devices becomes a research focus.

During fast charging, a large current or a high voltage is used to reduce charging time. As a result, a charging port of an electronic device or a charger is easily overheated in case of an abnormal contact, short-circuiting, or water entering, thereby causing an accident such as burning of the electronic device or even a fire.

SUMMARY

This application provides a charging protection method, a terminal, and a charger, to resolve a problem that a charging port easily causes an accident.

To achieve the foregoing objective, this application provides the following technical solutions.

A first aspect of this application provides a charging protection method, including the following steps: obtaining, by a terminal, a first current value and a second current value, where in a process in which a charger charges the terminal, an output current value of the charger is the first current value, and an input current value of the terminal is the second current value; calculating, by the terminal, a difference between the first current value and the second current value; and when the difference is greater than a protection current threshold, terminating, by the terminal, the process in which the charger charges the terminal, so as to effectively avoid an accident caused by an overheated charging interface.

A second aspect of this application provides a terminal, including a communications component and a processor. The communications component is configured to obtain an output current value of a charger in a process in which the charger charges the terminal. The processor is configured to: calculate a difference between the output current value of the charger and an input current value of the terminal, and when the difference is greater than a protection current threshold, terminate the process in which the charger charges the terminal.

In an implementation, before the terminal terminates the process in which the charger charges the terminal, the following is further included: The terminal sends out prompt information when the difference is greater than a warning current threshold, where the warning current threshold is less than the protection current threshold. Setting the warning threshold helps warn charging overheating.

In an implementation, a specific manner in which the terminal obtains the output current value of the charger is: sending a current obtaining request to the charger, and receiving the output current value sent by the charger.

A third aspect of this application provides another charging protection method, including the following steps: obtaining, by a terminal, a power loss in a process in which a charger charges the terminal; and when the power loss is greater than a protection power threshold, terminating, by the terminal, the process in which the charger charges the terminal, so as to effectively avoid an accident caused by an overheated charging interface.

A fourth aspect of this application provides another terminal, including a communications component and a processor. The communications component is configured to obtain an output current value and an output voltage value of a charger in a process in which the charger charges the terminal. The processor is configured to: obtain, based on the output current value and the output voltage value of the charger, a power loss in the process in which the charger charges the terminal, and when the power loss is greater than a protection power threshold, terminate the process in which the charger charges the terminal.

In an implementation, a specific manner of obtaining the power loss in the process in which the charger charges the terminal is: obtaining the power loss by calculating a difference between a first power value and a second power value. The first power value is a product of the output current value of the charger and the output voltage value of the charger, and the second power value is a product of an input current value of the terminal and an input voltage value of the terminal.

In an implementation, another specific manner of obtaining the power loss in the process in which the charger charges the terminal is: obtaining the power loss Pc by calculating $Pc=(Ua-Ub)\times Ia+(Ub-U_{battery})\times I_{battery}$. Ua is the output voltage value of the charger, Ub is an input voltage value of the terminal, Ia is the output current value of the charger, $U_{battery}$ is a voltage value on both ends of a battery of the terminal, and $I_{battery}$ is a current value of the battery of the terminal.

In an implementation, before the terminal terminates the process in which the charger charges the terminal, the following is further included: The terminal sends out prompt information when the power loss is greater than a warning power threshold, where the warning power threshold is less than the protection power threshold.

In an implementation, a specific manner of obtaining the output current value and the output voltage value of the charger is: sending a current value and voltage value obtaining request to the charger; and receiving the output current value and the output voltage value of the charger sent by the charger.

A fifth aspect of this application provides another charging protection method, including the following steps: obtaining, by a terminal, a first temperature value and a second temperature value, where in a process in which a charger charges the terminal, a temperature value of a charging output port of the charger is the first temperature value, and a temperature value of a charging input port of the terminal is the second temperature value; when the first temperature value is greater than a first temperature protection threshold or the second temperature value is greater than a second temperature protection threshold, terminating, by the terminal, the process in which the charger charges the terminal, so as to effectively avoid an accident caused by an overheated charging interface.

A sixth aspect of this application provides another terminal, including a communications component and a processor. The communications component is configured to obtain a temperature value of a charging output port of a charger in a process in which the charger charges the terminal. The processor is configured to: when the temperature value of the charging output port of the charger is greater than a first temperature protection threshold or a temperature value of a charging input port of the terminal is greater than a second temperature protection threshold, terminate the process in which the charger charges the terminal.

In an implementation, the terminal further includes a temperature sensor disposed on the charging input port of the terminal. The processor is further configured to obtain the temperature value of the charging input port of the terminal from the temperature sensor.

In an implementation, before terminating the process in which the charger charges the terminal, the terminal sends out prompt information when the temperature value of the charging output port of the charger is greater than a first alarm temperature threshold or the temperature value of the charging input port of the terminal is greater than a second alarm temperature threshold, where the first alarm temperature threshold is less than the first protection temperature threshold, and the second alarm temperature threshold is less than the second protection temperature threshold.

In an implementation, a specific manner in which the terminal obtains the temperature value of the charging output port of the charger is: sending a temperature value obtaining request to the charger; and receiving the temperature value of the charging output port of the charger sent by the charger.

In an implementation, terminating the process in which the charger charges the terminal includes: instructing the charger to terminate charging the terminal; and/or terminating, by the terminal, the charging process.

A seventh aspect of this application provides a charger, including a power output circuit, a controller, and an analog-to-digital converter. The power output circuit is configured to output power. The controller is configured to receive a request for obtaining a parameter, where the parameter includes at least one of an output current value and an output voltage value of the power output circuit. The analog-to-digital converter is configured to measure the output current value and/or the output voltage value. The controller is further configured to send the parameter. The charger measures the output current value and/or the output voltage value by using the analog-to-digital converter, so that a terminal can obtain the output current value and/or the output voltage value of the charger, and the terminal can perform charging protection based on the output current value and/or the output voltage value of the charger.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
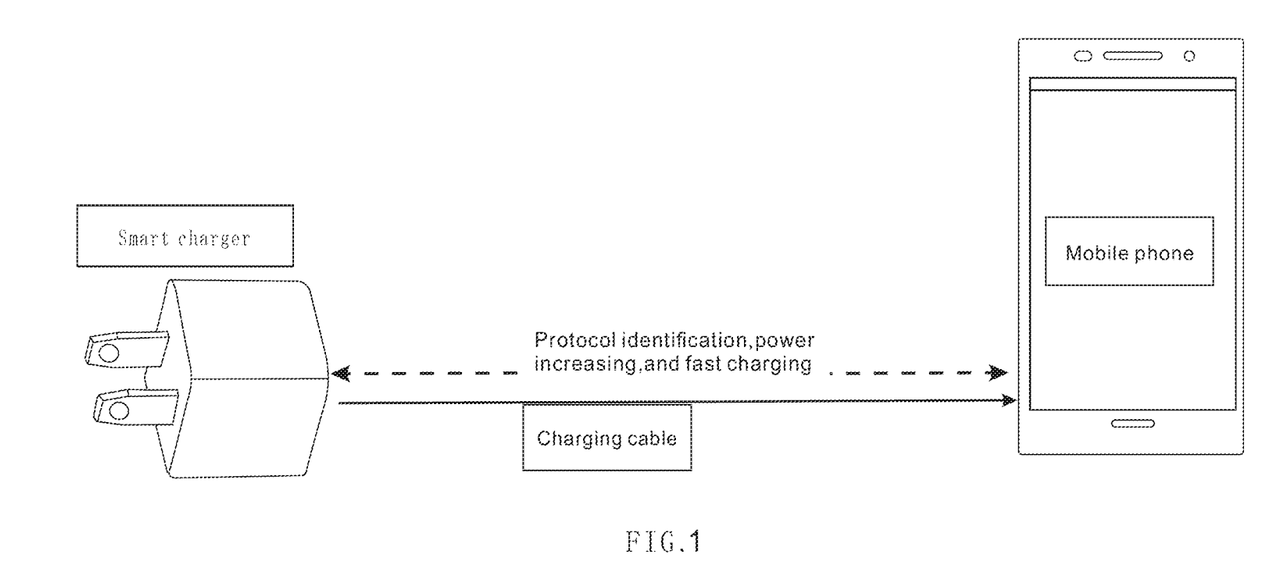
FIG. 1 is a schematic diagram in which a terminal is connected to a charger by using a charging cable.

As shown in FIG. 1, a terminal such as a mobile phone is connected to a charger by using a charging cable. Specifically, the terminal is connected to the charging cable by using a USB port, and the charger may also be connected to the charging cable by using a USB port. When charging starts, charging protocol identification is performed between the charger and the terminal. The charger outputs a specific voltage or current according to an instruction of the terminal, so as to charge the terminal.

The terminal and the charger disclosed in embodiments of this application are intended to reduce a possibility that the terminal or the charger causes an accident due to an abnormal contact, short-circuiting, or water entering of a charging port.

The charger described in the technical solutions described in the embodiments of this application may be a smart charger (for example, a charger that has a single-chip microcomputer for implementing a control and processing function), or may be a charger with a constant output current, or the technical solutions described in the embodiments of this application are applied to a constant current charging stage.

Figure 2:
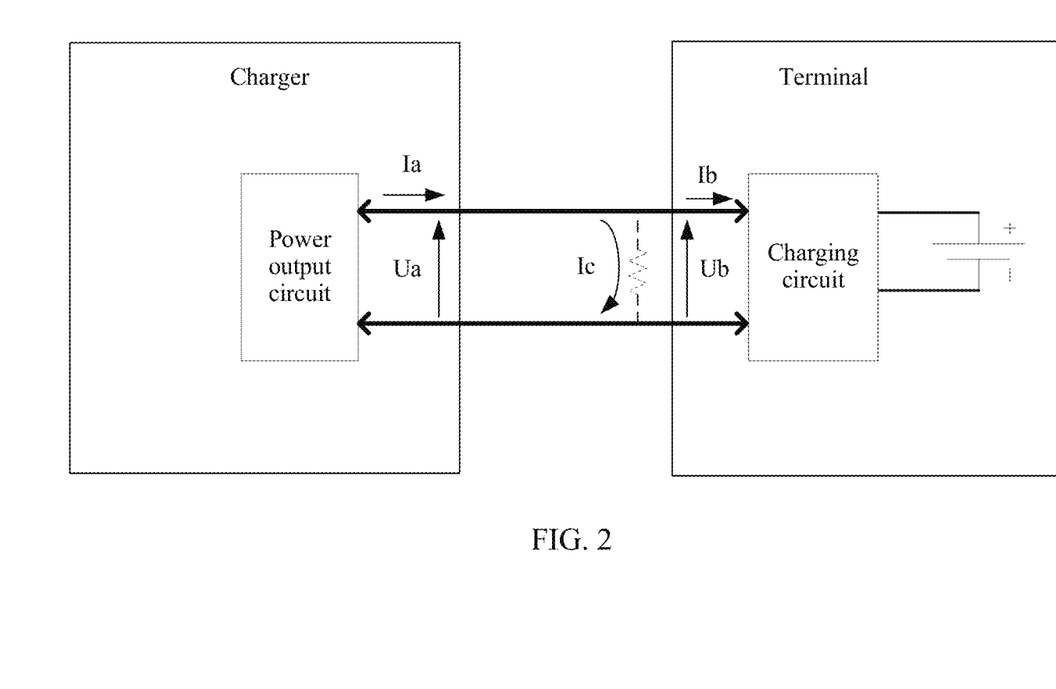
FIG. 2 is a simplified schematic circuit diagram in which a charger charges a terminal.

FIG. 2 is a simplified schematic circuit diagram in which the charger in FIG. 1 charges the terminal in FIG. 1. An output voltage value of the charger is Ua, an output current value of the charger is Ia, an input voltage value of the terminal is Ub, and an input current value of the terminal is Ib. It is assumed that a short-circuit resistance (shown by a dashed line in FIG. 2) exists between an output port of the charger and an input port of the terminal, and a generated short-circuit current value is Ic. In a normal case, Ic is zero. When a detection error is not considered, according to Thevenin's theorem, Ia=Ib+Ic. Therefore, if Ia=Ib, it indicates that the circuit is normal; otherwise, it indicates that the circuit is abnormal.

According to the foregoing principle, whether a charging circuit is normal may be detected by using a difference between Ia and Ib.

Figure 3:
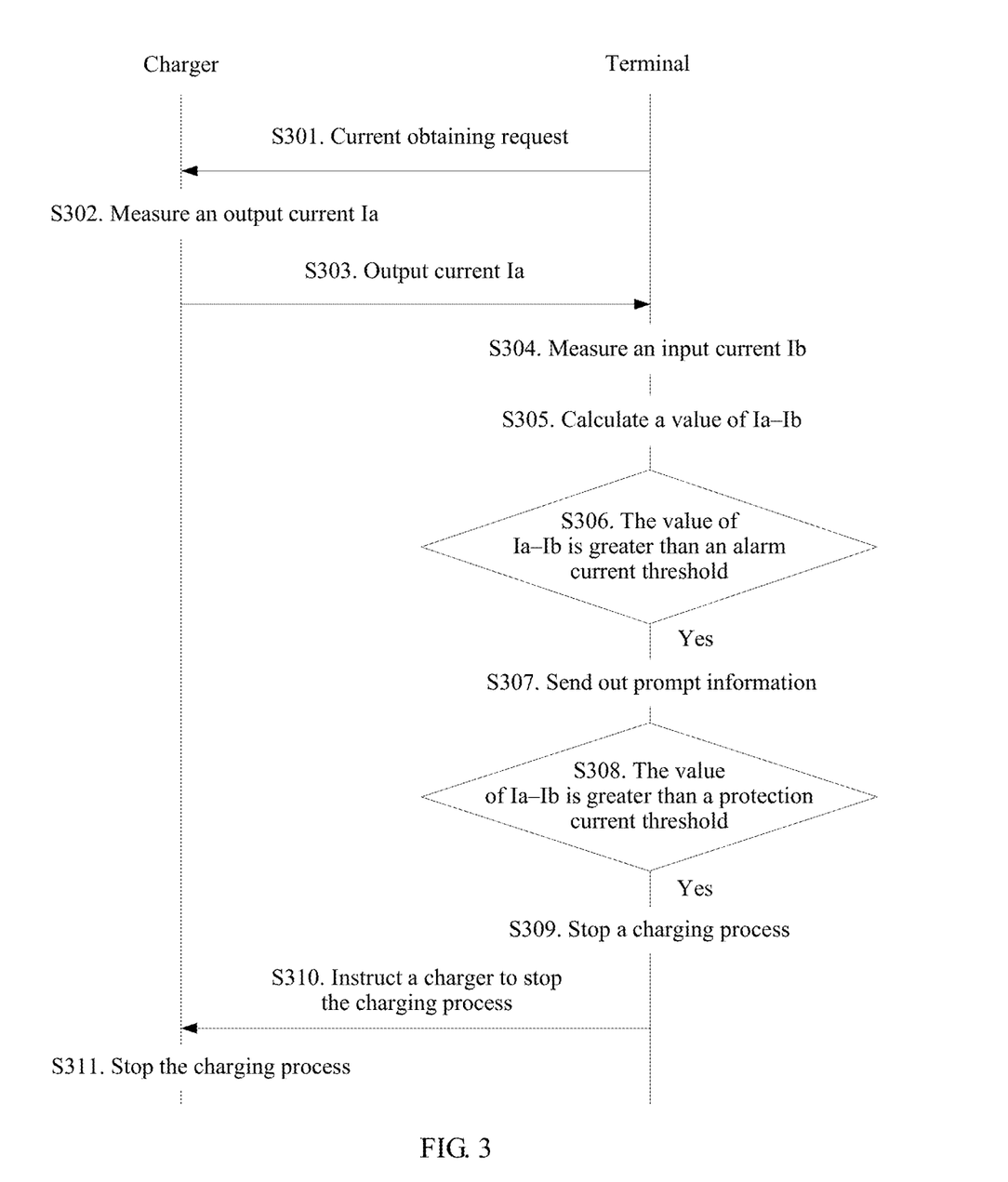
FIG. 3 is a flowchart of a charging protection method according to an embodiment of the present invention.

FIG. 3 shows a process in which the terminal and the charger shown in FIG. 1 perform charging protection based on the circuit shown in FIG. 2. The process includes the following steps:

S301. The terminal sends a current value obtaining request to the charger, to obtain an output current value Ia of the charger.

S302. The charger measures the output current value Ia.

It should be noted that in this embodiment and in the following embodiments, information between the terminal and the charger may be transmitted by using a data cable between the terminal and the charger, or may be transmitted by using communications modules in the terminal and the charger, for example, transmitted by using Bluetooth modules.

S303. The charger sends the output current value Ia to the terminal.

S304. The terminal measures an input current value Ib.

S305. The terminal calculates a value of Ia−Ib.

S306. The terminal determines whether the value of Ia−Ib is greater than an alarm current value threshold. If yes, perform S307; if no, perform no processing or periodically perform S301 to S306.

S307. The terminal sends out prompt information. The prompt information is used to remind that a charging port may be abnormal.

Specifically, any one or more types of prompts such as a display prompt or a sound prompt may be sent out.

S308. The terminal determines whether the value of Ia−Ib is greater than a protection current threshold. If yes, perform S309; if no, perform no processing or periodically perform S308.

It should be noted that the alarm current threshold is less than the protection threshold. Setting the alarm current threshold is intended to predetermine a possible accident, so as to avoid an accident to a maximum extent. S306 and S307 are optional steps. S306 and S307 may not be performed and S308 is directly performed.

S309. The terminal stops a charging process.

S310. The terminal instructs the charger to stop the charging process.

S311. The charger stops the charging process, that is, stops outputting a voltage and a current to the outside.

It can be learned from the process shown in FIG. 3 that, when the value of Ia−Ib is greater than the protection threshold, the terminal can stop charging and cut off the charging process of the charger. In this way, the charging port can be effectively prevented from causing an accident such as burning or even a fire.

Figure 4:
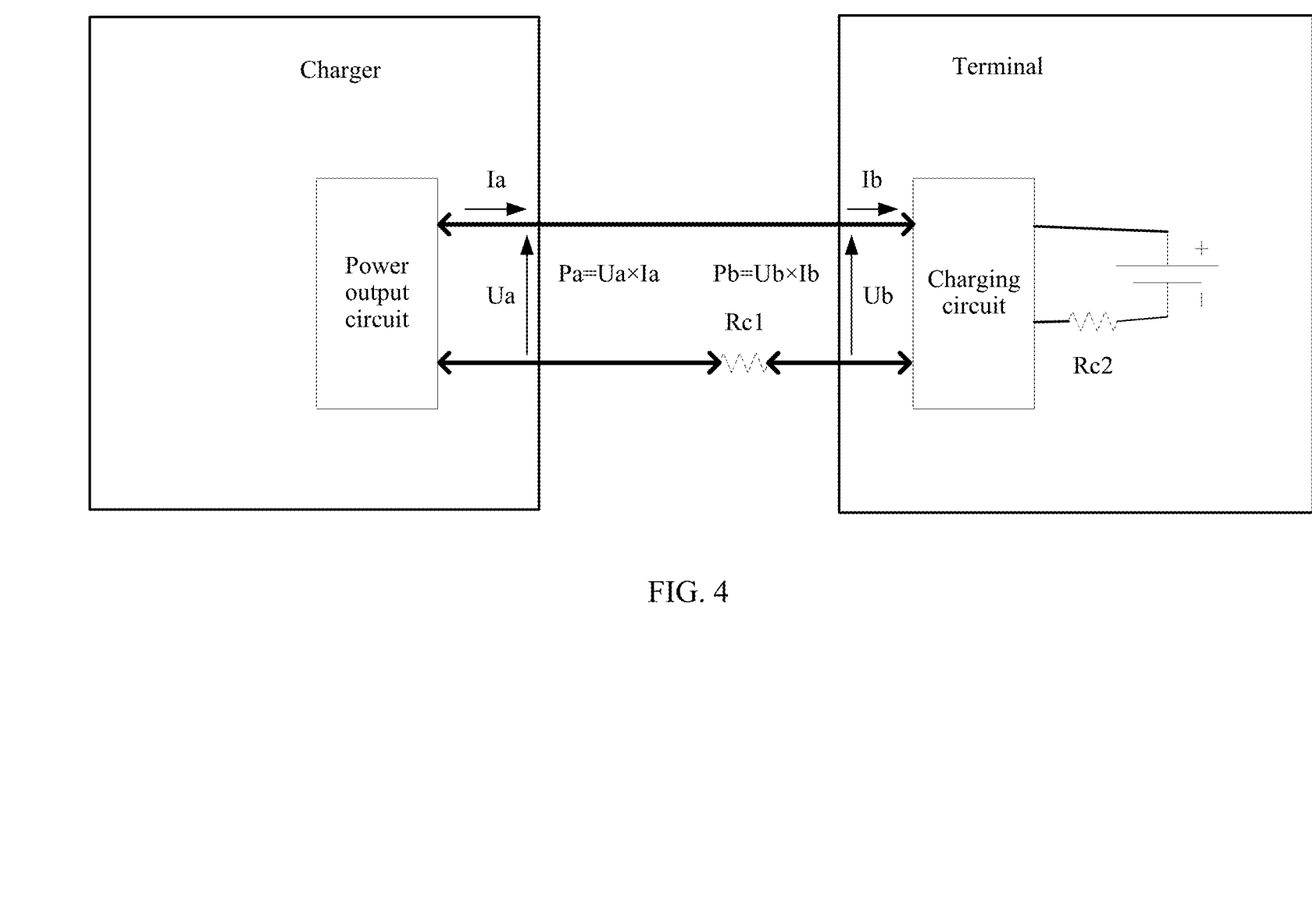
FIG. 4 is another simplified schematic circuit diagram in which a charger charges a terminal.

In addition to the method shown in FIG. 3, an accident may be further determined based on a method shown in FIG. 4. In FIG. 4, output power of a charger is Pa=Ua×Ia. Ua is an output voltage value of the charger, and Ia is an output current value of the charger. Input power of a terminal is Pb=Ub×Ib. Ub is an input voltage value of the terminal, and Ib is an input current value of the terminal. It is assumed that a power loss in a process in which power of the charger reaches a port of the terminal through a charging cable is Pc. According to the law of conservation of energy:

$$Pc=Pa-Pb$$

In a normal case, Pc is within a specific range. If Pc is excessively large, it indicates that the power loss is excessively high.

Figure 5:
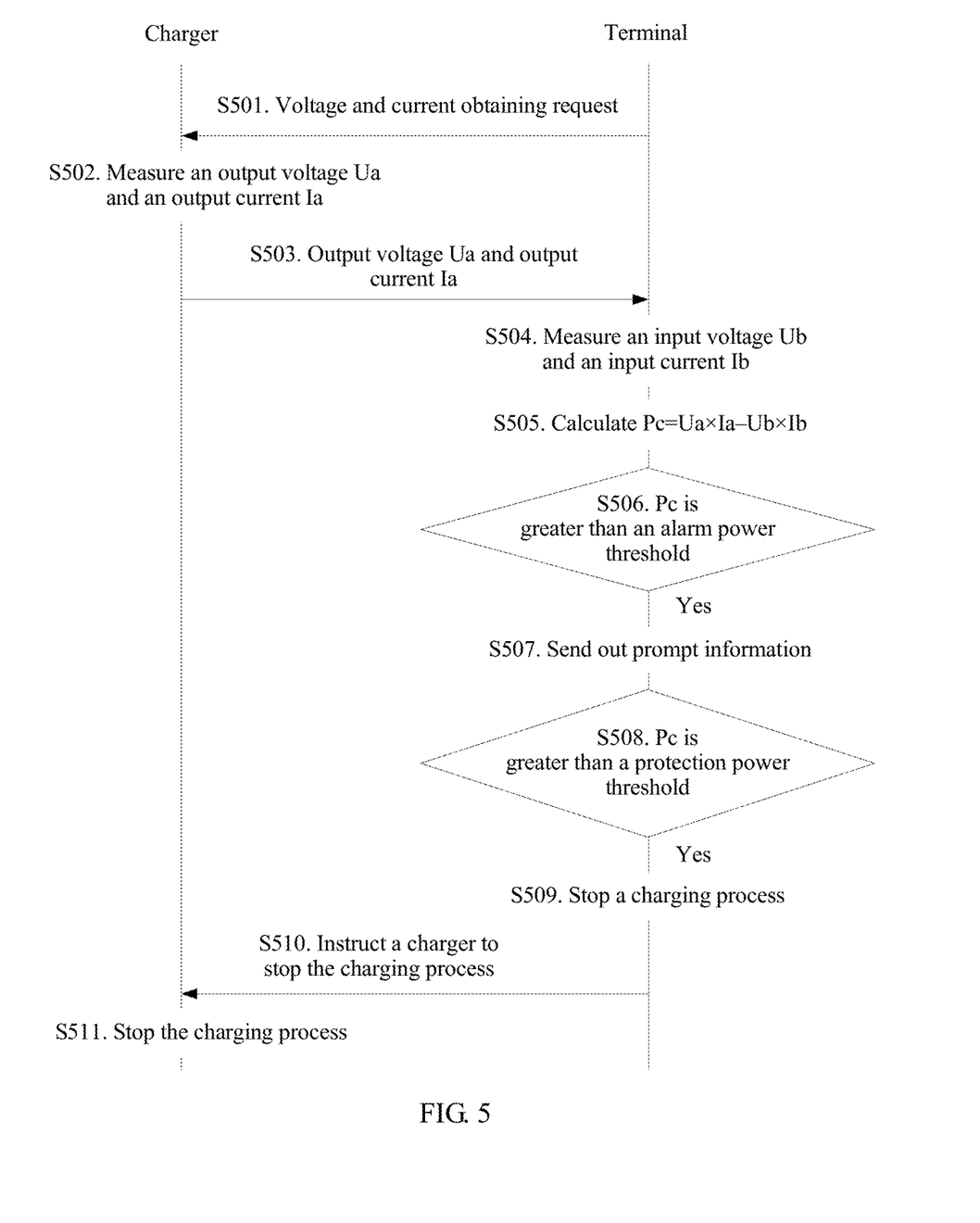
FIG. 5 is a flowchart of another charging protection method according to an embodiment of the present invention.

According to the foregoing principle, an embodiment of this application discloses another charging protection method. As shown in FIG. 5, the method includes the following steps:

S501. A terminal sends a voltage value and current value obtaining request to a charger, to obtain an output voltage value Ua and an output current value Ia of the charger.

S502. The charger measures the output voltage value Ua and the output current value Ia.

S503. The charger sends the output voltage value Ua and the output current value Ia to the terminal.

S504. The terminal measures an input voltage value Ub and an input current value Ib.

S505. The terminal calculates Pc=Ua×Ia−Ub×Ib.

S506. The terminal determines whether Pc is greater than an alarm power threshold. If yes, perform S507; if no, perform no processing or periodically perform S501 to S506.

S507. The terminal sends out prompt information.

S508. The terminal determines whether Pc is greater than a protection power threshold. If yes, perform S509; if no, perform no processing or periodically perform S508.

S509. The terminal stops a charging process.

S510. The terminal instructs the charger to stop the charging process.

S511. The charger stops the charging process, that is, stops outputting a voltage and a current to the outside.

It may be learned that, different from the process shown in FIG. 3, in this embodiment, a power loss from the charger to the terminal is used to prevent an accident in the charging process.

Figure 6:
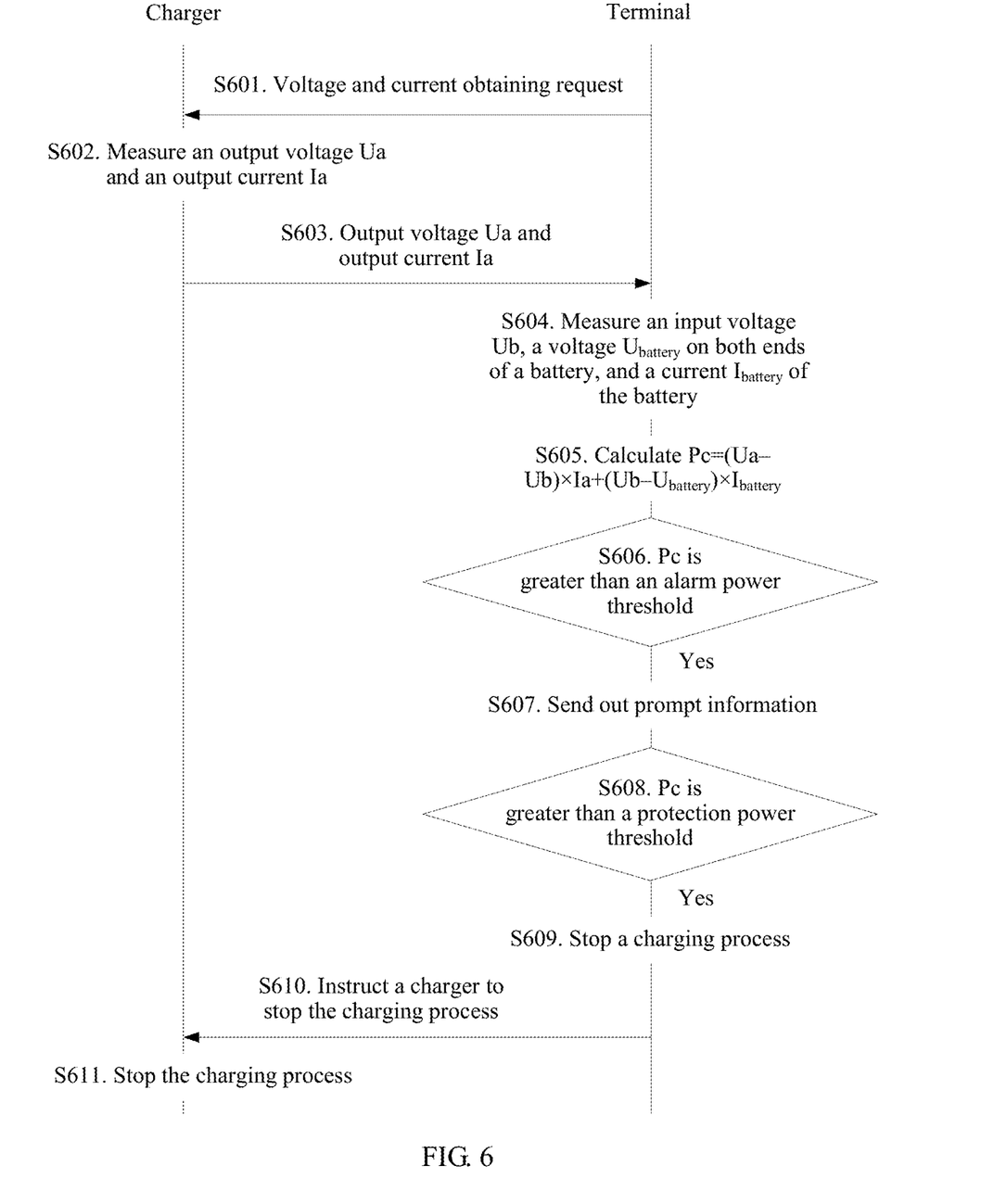
FIG. 6 is a flowchart of another charging protection method according to an embodiment of the present invention.

It should be noted that, as shown by a dashed line shown in FIG. 4, impedance Rc exists between the charger and the terminal. Rc is a sum of impedance Rc1 of the charging cable and mainboard cable impedance Rc2 of the terminal. A sum of power losses of all the impedance is the power loss Pc between the charger and the terminal. Specifically, the impedance of the charging cable is (the output voltage value Ua of the charger−the input voltage value Ub of the terminal)/the output current value Ia of the charger. A power loss caused by the impedance is Pc1=I$^2$R=Ia$^2$×(Ua−Ub)/Ia=(Ua−Ub)×Ia. The mainboard cable impedance of the terminal is (Ub−a voltage value U$_{battery}$ of a battery)/a current value I$_{battery}$ of the battery. A power loss caused by the impedance is Pc2=I$^2$R=I$_{battery}^2$×(Ub−U$_{battery}$)/I$_{battery}$=(Ub−U$_{battery}$)×I$_{battery}$. Therefore, Pc=Pc1+Pc2=(Ua−Ub)×Ia+(Ub−U$_{battery}$)×I$_{battery}$. According to this principle, FIG. 6 discloses another charging protection method. The method includes the following steps:

S601. A terminal sends a voltage value and current value obtaining request to a charger, to obtain an output voltage value Ua and an output current value Ia of the charger.

S602. The charger measures the output voltage value Ua and the output current value Ia.

S603. The charger sends the output voltage value Ua and the output current value Ia to the terminal.

S604. The terminal measures an input voltage value Ub, a voltage value U$_{battery}$ on both ends of a battery, and a current value battery of the battery.

S605. The terminal calculates Pc=(Ua−Ub)×Ia+(Ub−U$_{battery}$)×I$_{battery}$.

S606 to S611 are the same as S506 to S511. Details are not described herein again.

Figure 7:
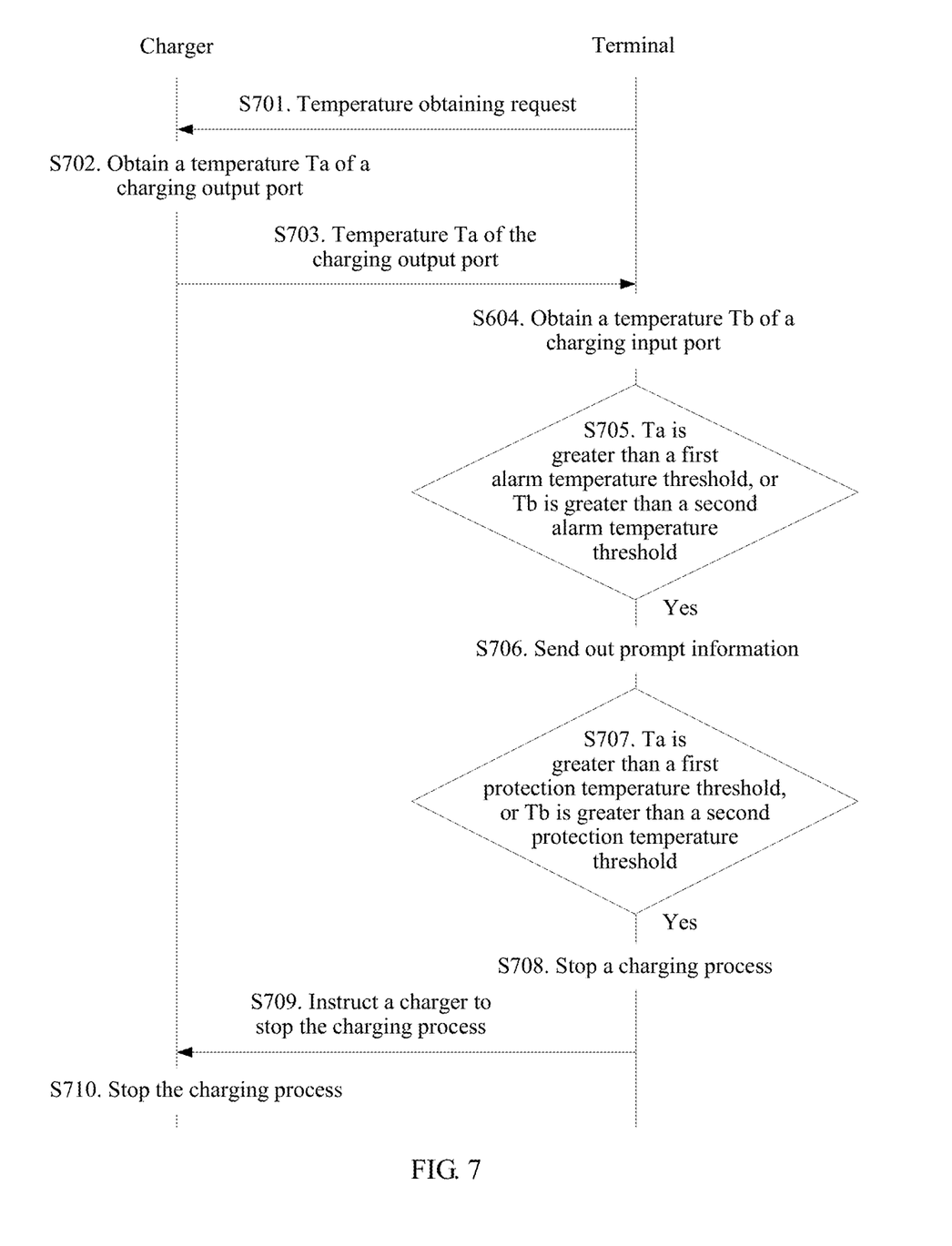
FIG. 7 is a flowchart of another charging protection method according to an embodiment of the present invention.

FIG. 7 shows another charging protection method according to an embodiment of this application. The method includes the following steps:

S701. A terminal sends a temperature value obtaining request to a charger.

S702. The charger obtains a temperature value Ta of a charging output port by using a temperature value sensor disposed on the charging output port.

S703. The charger sends Ta to the terminal.

S704. The terminal obtains a temperature value Tb of a charging input port by using a temperature sensor disposed on the charging input port.

S705. The terminal determines whether Ta is greater than a first alarm temperature threshold or whether Tb is greater than a second alarm temperature threshold. If either of the foregoing conditions is yes, perform S706. If neither of the foregoing two conditions is met, perform no processing or periodically perform S701 to S705.

S706. The terminal sends out prompt information.

S707. The terminal determines whether Ta is greater than a first protection temperature threshold or whether Tb is greater than a second protection temperature threshold. If either of the foregoing conditions is yes, perform S708. If neither of the foregoing two conditions is met, perform no processing or periodically perform S707.

S708. The terminal stops a charging process.

S709. The terminal instructs the charger to stop the charging process.

S710. The charger stops the charging process.

In FIG. 7, the temperature value is used as a basis for charging protection, to help avoid an accident in the charging process. It should be noted that the charging protection method shown in FIG. 7 may be applied to an existing charger and terminal, and is not limited to a smart charger or a constant current charger, and is not limited to a constant current scenario either.

It should be noted that the processes shown in FIG. 3, FIG. 5 (or FIG. 6), and FIG. 7 may be used in any combination. For example, the process shown in FIG. 3 and the process shown in FIG. 7 are combined to perform charging protection.

Figure 8:
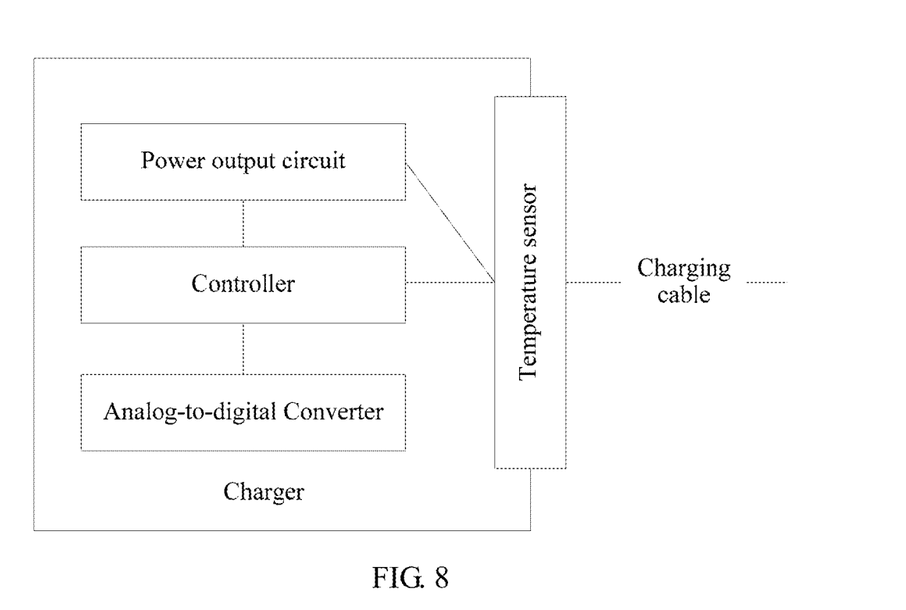
FIG. 8 is a schematic structural diagram of a charger according to an embodiment of the present invention.

FIG. 8 shows a structure of the charger shown in FIG. 1, including a power output circuit, a controller, and an analog-to-digital converter. Optionally, the charger may further include a temperature sensor disposed on an output port (not drawn).

The power output circuit is configured to output power, so as to charge a terminal. The controller is configured to receive a parameter (for example, at least one of an output current value, an output voltage value, and a temperature value) obtaining request sent by the terminal. Correspondingly, the analog-to-digital converter is configured to measure an output current value and/or an output voltage value of the charger, namely, perform at least one of S302, S502, and S602. The temperature sensor is configured to sense a temperature value, namely, perform S702. Correspondingly, the controller is further configured to send a parameter (for example, at least one of the output current value, the output voltage value, and the temperature value), namely, perform at least one of S303, S503, S603, and S703. Specifically, the controller may receive and send the request or the parameter by using the output port and a charging cable (or by using a wireless communications module).

Figure 9:
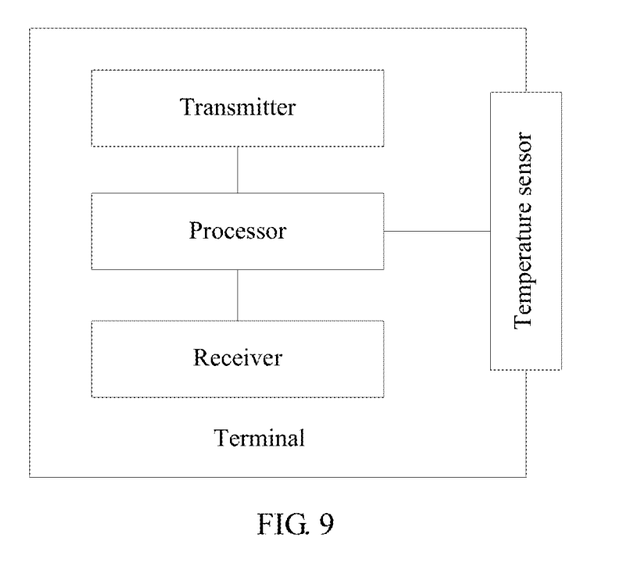
FIG. 9 is a schematic structural diagram of a terminal according to an embodiment of the present invention.

FIG. 9 shows a structure of the terminal shown in FIG. 1, including a transmitter, a receiver, and a processor. Optionally, the terminal may further include a temperature sensor disposed on a charging input port. The transmitter and the receiver constitute a communications component.

The transmitter is configured to send a parameter (for example, at least one of an output current value, an output voltage value, and a temperature value) obtaining request to a charger, namely, perform at least one of S301, S501, S601, and S701. Correspondingly, the receiver is configured to receive a parameter (for example, at least one of the output current value, the output voltage value, and the temperature value) sent by the charger. The temperature sensor is configured to sense a temperature value. Correspondingly, the processor is configured to perform at least one of 1, 2, 3, and 4. 1 represents S304 to S310, 2 represents S504 to S510, 3 represents S604 to S610, and 4 represents S704 to S709.

Figure 10:
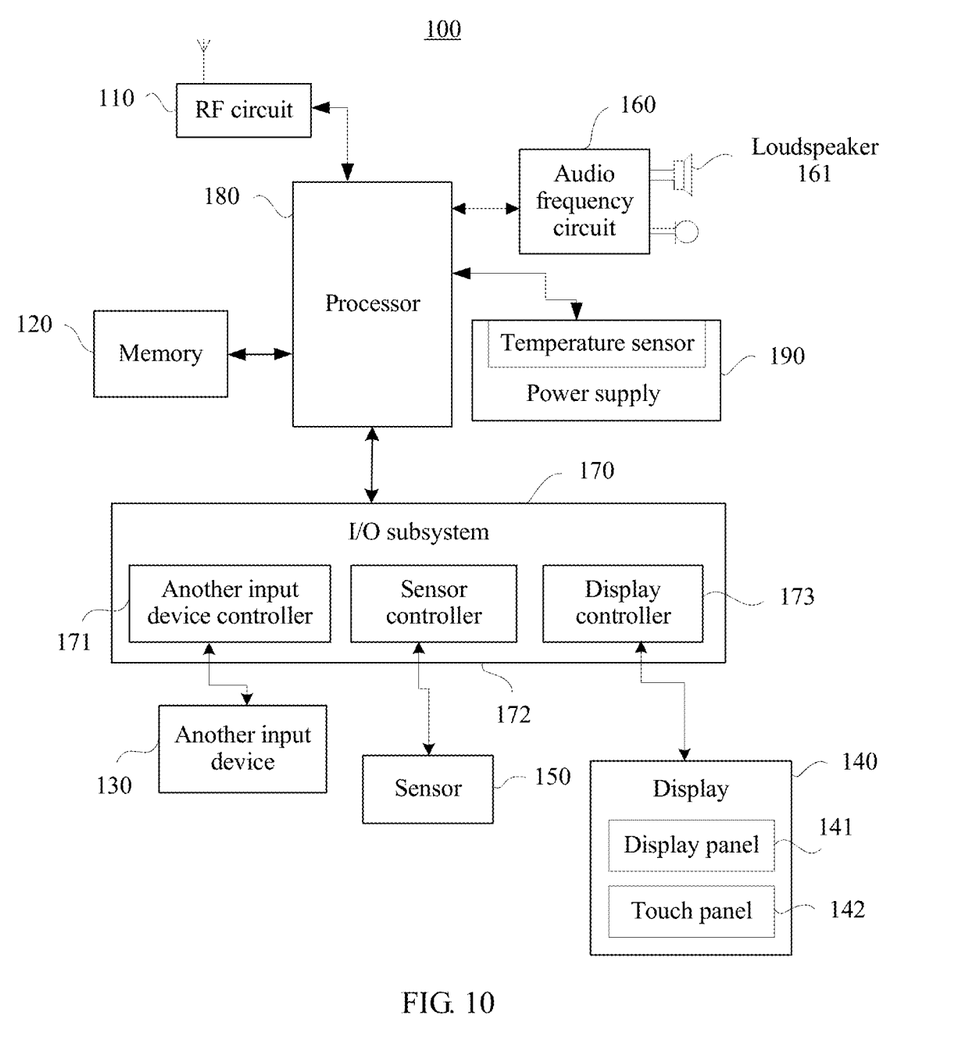
FIG. 10 is a schematic structural diagram of another terminal according to an embodiment of the present invention.

For example, the terminal is a mobile phone. FIG. 10 shows a more specific structure of the terminal shown in FIG. 9. A mobile phone 100 includes components such as an RF (Radio Frequency, radio frequency) circuit 110 (that is, a specific implementation form of a transmitter and a receiver), a memory 120, another input device 130, a display 140, a sensor 150, an audio frequency circuit 160, an I/O subsystem 170, a processor 180, and a power supply 190. A person skilled in the art may understand that the structure of the mobile phone shown in FIG. 10 imposes no limitation on the mobile phone, and may include more or fewer components than those shown in the figure, combine some components, split some components, or have different component arrangements. A person skilled in the art may understand that the display 140 is a user interface (UI, User Interface), and the mobile phone 100 may include more or fewer user interfaces than those shown in the figure.

Specifically, the RF circuit 110 may be configured to receive and send information. With reference to the embodiments of this application, the RF circuit 110 is configured to send a parameter (for example, at least one of an output current, an output voltage value, and a temperature value) obtaining request to a charger, namely, perform at least one of S301, S501, S601, and S701, and configured to receive a parameter (for example, at least one of the output current, the output voltage value, and the temperature value) sent by the charger. Alternatively, the RF circuit 110 may be further configured to receive and send a signal in a call process. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may communicate with a network and another device through wireless communication. Any communications standard or protocol may be used for the wireless communication, including but not limited to: GSM (Global System for Mobile Communications, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Messaging Service, short messaging service), and the like.

The memory 120 may be configured to store a software program and a module. The processor 180 executes various functional applications and data processing of the mobile phone 100 by running the software program and the module stored in the memory 120. The memory 120 may mainly include a program storage area and a data storage area. The program storage area may store an operating system, an application program required by at least one function (such as a sound play function or an image play function), and the like. The data storage area may store data (such as audio data or an address book) created based on use of the mobile phone 100, and the like. In addition, the memory 120 may include a high-speed random access memory, or may include a nonvolatile memory, such as at least one magnetic disk storage device, a flash memory device, or another volatile solid-state storage device.

The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, so as to perform overall monitoring on the mobile phone. Optionally, the processor 180 may include one or more processing units. Preferably, an application processor and a modem processor may be integrated into the processor 180. The application processor mainly processes an operating system, a user interface, an application program, and the like. The modem processor mainly processes wireless communication. It may be understood that the modem processor may not be integrated into the processor 180. With reference to the embodiments of this application, the processor is configured to perform at least one of 1, 2, 3, and 4. 1 represents S304 to S310, 2 represents S504 to S510, 3 represents S604 to S610, and 4 represents S704 to S709.

The mobile phone 100 further includes the power supply 190 (such as a battery) that supplies power to the components. Preferably, the power supply may be logically connected to the processor 180 by using a power management system, so as to implement functions such as charging management, discharging management, and power consumption management by using the power management system. Optionally, the power supply 190 includes a temperature sensor disposed on a charging input port.

The another input device 130 may be configured to: receive entered digit or character information, and generate key signal input related to user setting and function control of the mobile phone 100. Specifically, the another input device 130 may include but is not limited to one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), and the like. The another input device 130 is connected to another input device controller 171 in the I/O subsystem 170, and exchanges a signal with the processor 180 under the control of the another device input controller 171.

The display 140 may be configured to display information entered by a user or information provided for the user, and various menus of the mobile phone 100, and may further receive user input. Specifically, the display 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142, also referred to as a touchscreen, a touch-sensitive screen, or the like, may collect a touch or non-touch operation (for example, an operation performed by the user on the touch panel 142 or near the touch panel 142 by using any proper object or accessory, such as a finger or a stylus, or may include a motion sensing operation, where the operation includes operation types such as a single-point control operation and a multipoint control operation) of the user on or near the touch panel 142, and drive a corresponding connection apparatus based on a preset program. Optionally, the touch panel 142 may include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor, then sends the information to the processor 180, and can receive and execute a command sent by the processor 180. In addition, the touch panel 142 may be implemented by using a plurality of types, such as a resistive type, a capacitive type, an infrared ray, and a surface acoustic wave, or the touch panel 142 may be implemented by using any future technology. Further, the touch panel 142 may cover the display panel 141. The user may perform, based on content displayed on the display panel 141 (the displayed content includes but is not limited to a soft keyboard, a virtual mouse, a virtual key, an icon, and the like), an operation on or near the touch panel 142 that covers the display panel 141. After detecting the operation on or near the touch panel 142, the touch panel 142 sends the operation to the processor 180 by using the I/O subsystem 170 to determine user input. Then, the processor 180 provides, based on the user input, corresponding visual output on the display panel 141 by using the I/O subsystem 170. Although the touch panel 142 and the display panel 141 in FIG. 4 are used as two separate parts to implement input and input functions of the mobile phone 100, in some embodiments, the touch panel 142 and the display panel 141 may be integrated to implement the input and output functions of the mobile phone 100.

The mobile phone 100 may further include at least one sensor 150, such as a light sensor, a motion sensor, and another sensor. Specifically, the light sensor may include an ambient light sensor and a proximity sensor. The ambient light sensor may adjust luminance of the display panel 141 based on brightness or dimness of ambient light. The proximity sensor may close the display panel 141 and/or backlight when the mobile phone 100 approaches an ear. As one type of the motion sensor, an accelerometer sensor may detect acceleration values in different directions (usually, three axes), may detect a value and a direction of gravity in a static state, and may be applied to an application used for identifying a mobile phone posture (for example, screen switching between landscape and portrait modes, a related game, or magnetometer posture calibration), a function related to vibration identification (such as a pedometer or a knock), and the like. Other sensors such as a gyroscope, a barometer, a hygrometer, a thermometer, and an infrared sensor may also be disposed on the mobile phone 100, and details are not described herein.

The audio frequency circuit 160, a loudspeaker 161, and a microphone 162 may provide an audio interface between the user and the mobile phone 100. The audio frequency circuit 160 may transmit, to the loudspeaker 161, a signal converted from received audio data, and the loudspeaker 161 converts the signal into a sound signal for output. In addition, the microphone 162 converts a collected sound signal into a signal, and the audio frequency circuit 160 receives the signal, converts the signal into audio data, and then outputs the audio data to the RF circuit 108, so as to send the audio data to, for example, another mobile phone, or output the audio data to the memory 120 for further processing.

The I/O subsystem 170 is configured to control an external input/output device, and may include the another input device controller 171, a sensor controller 172, and a display controller 173. Optionally, one or more other input device controllers 171 receive a signal from the another input device 130 and/or send a signal to the another input device 130. The another input device 130 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input device controller 171 may be connected to any one or more of the foregoing devices. The display controller 173 in the I/O subsystem 170 receives a signal from the display 140 and/or sends a signal to the display 140. After the display 140 detects user input, the display controller 173 converts the detected user input into interaction with a user interface object displayed on the display 140, to implement human-computer interaction. The sensor controller 172 may receive a signal from one or more sensors 150 and/or send a signal to one or more sensors 150.

Although not shown, the mobile phone 100 may further include a camera, a Bluetooth module, and the like. Details are not described herein.

For specific implementation processes of functions of the charger shown in FIG. 8 and the terminal shown in FIG. 9 and FIG. 10, refer to the foregoing method flowcharts. Details are not described herein again.

What is claimed is:

1. A charging protection method for a process in which a charger charges a terminal, comprising:
   receiving, by the terminal and from the charger, an output voltage value and an output current value of the charger;
   measuring, by the terminal, an input voltage value of the terminal;
   measuring, by the terminal, a voltage value on both ends of a battery of the terminal;
   measuring, by the terminal, a current value of the battery of the terminal;
   obtaining, by the terminal, a power loss in the process in which the charger charges the terminal, by calculating Pc=(Ua−Ub)×Ia+(Ub−Ubattery)×Ibattery, wherein Pc is the power loss, Ua is the output voltage value of the charger, Ub is the input voltage value of the terminal, Ia is the output current value of the charger, Ubattery is the voltage value on both ends of the battery of the terminal, and Ibattery is the current value of the battery of the terminal, and wherein both the Ubattery and the Ibattery are related to a mainboard cable impedance of the terminal, and the Ibattery and the Ia are different; and
   based on the power loss being greater than a protection power threshold, terminating, by the terminal, the process in which the charger charges the terminal.

2. The method according to claim 1, before the terminating, by the terminal, the process in which the charger charges the terminal, further comprising:
   sending out, by the terminal, prompt information when the power loss is greater than a warning power threshold, wherein the warning power threshold is less than the protection power threshold.

3. The method according to claim 1, wherein the terminating, by the terminal, the process in which the charger charges the terminal comprises:
   instructing, by the terminal, the charger to terminate charging the terminal; or
   terminating, by the terminal, the process in which the charger charges the terminal.

4. The method according to claim 1, wherein before receiving the output voltage value and the output current value of the charger, the method further comprises:
   sending a current obtaining request to the charger.

5. A terminal, comprising:
   a receiver, configured to obtain an output current value and an output voltage value of a charger in a process in which the charger charges the terminal;
   at least one processor; and
   one or more memories coupled to the at least one processor and storing programming instructions for execution by the at least one processor to:
   measure an input voltage value of the terminal;
   measure a voltage value on both ends of a battery of the terminal;
   measure a current value of the battery of the terminal;
   obtain a power loss in the process in which the charger charges the terminal, by calculating Pc=(Ua−Ub)×Ia+(Ub−Ubattery)×Ibattery, wherein Pc is the power loss, Ua is the output voltage value of the charger, Ub is the input voltage value of the terminal, Ia is the output current value of the charger, Ubattery is the voltage value on both ends of the battery of the terminal, and Ibattery is the current value of the battery of the terminal, and wherein both the Ubattery and the Ibattery are related to a mainboard cable impedance of the terminal, and the Ibattery and the Ia are different; and
   based on the power loss being greater than a protection power threshold, terminate the process in which the charger charges the terminal.

6. The terminal according to claim 5, wherein obtaining the power loss comprises calculating a difference between a first power value and a second power value, wherein the first power value is a product of the output current value of the charger and the output voltage value of the charger, and the second power value is a product of an input current value of the terminal and the input voltage value of the terminal.

7. The terminal according to claim 5, wherein the one or more memories storing programming instructions for execution by the at least one processor to:
   before terminating the process in which the charger charges the terminal, send out prompt information when the power loss is greater than a warning power threshold, wherein the warning power threshold is less than the protection power threshold.

8. The terminal according to claim 5, wherein the one or more memories storing programming instructions for execution by the at least one processor to:
   instruct the charger to terminate charging the terminal; or
   terminate the process in which the charger charges the terminal.

9. The terminal according to 41, wherein the one or more memories storing programming instructions for execution by the at least one processor to:
   send a current obtaining request to the charger before receiving the output voltage value and the output current value of the charger.

* * * * *

UNITED STATES PATENT AND TRADEMARK OFFICE
CERTIFICATE OF CORRECTION

PATENT NO. : 11,476,684 B2
APPLICATION NO. : 16/328951
DATED : October 18, 2022
INVENTOR(S) : Fenwei Zhang and Haitao Tian It is certified that error appears in the above-identified patent and that said Letters Patent is hereby corrected as shown below:

In the Claims

In Column 12, In Line 52, In Claim 9, delete "41," and insert -- claim 5, --.

Signed and Sealed this
Sixteenth Day of May, 2023

Katherine Kelly Vidal
Director of the United States Patent and Trademark Office